United States Patent [19]
Chatelon et al.

[11] 3,891,806
[45] June 24, 1975

[54] SYSTEM FOR PREVENTING INTELLIGIBLE CROSSTALK IN TDM SWITCHING SYSTEMS

[75] Inventors: André Edouard Joseph Chatelon, Montrouge; André Lucien Coudray, Buzenval Par Rueil-Malmaison, both of France

[73] Assignee: International Standard Electric Corporation, New York, N.Y.

[22] Filed: Nov. 28, 1973

[21] Appl. No.: 419,550

[30] Foreign Application Priority Data

Dec. 15, 1972 France .............................. 72.44665

[52] U.S. Cl. ............................ 179/15 AN; 178/69 B
[51] Int. Cl. .............................................. H04j 3/10
[58] Field of Search ......... 179/15 AN, 15 AT, 78 R; 178/69 B; 317/8; 325/472; 333/12; 307/89

[56] References Cited

FOREIGN PATENTS OR APPLICATIONS 1,940,027 2/1970 Germany ........................ 179/15 AN

*Primary Examiner*—David L. Stewart
*Attorney, Agent, or Firm*—James B. Raden; D. P. Warner

[57] ABSTRACT

Apparatus is disclosed for protecting against intelligible crosstalk in a PCM-TDM system. Such crosstalk may arise when there is a failure in the system causing a mixing of signals in a first channel with signals from a second incoming channel. When the first channel is silent (sign bit zero and amplitude train zero) signals from the second channel may be added to the zero train causing the receiving subscriber of the first channel to receive undesirable crosstalk. To combat this situation, the invention employs two code conversion devices in series in a line. The first device inverts coded combinations having a sign bit 0 while transmitting without modification those with sign bit 1. The second device adjacent the output cancels the inversion of the first device to provide normal combinations to the called line.

3 Claims, 2 Drawing Figures

SYSTEM FOR PREVENTING INTELLIGIBLE CROSSTALK IN TDM SWITCHING SYSTEMS

BACKGROUND OF THE INVENTION

1. Field of the Invention

The present invention concerns an intelligible cross-talk protective system for use in centers provided for time division switching of PCM signals or pulse code modulated signals and, more specially, for use in telephone exchanges of that type.

2. Description of the Prior Art

In such a center, the voice frequency signals originating from subscriber's lines are sampled at 8kHz and each sample is converted by a coder into a coded combination of 8 bits including a bit indicating the polarity and 7 bits defining the amplitude of the sample. The coded combinations originating from 32 lines, for instance, are transmitted to a multiplexor which constitutes a series primary multiplex group. More precisely, within a multiplex cycle of 125$\mu$s, corresponding to the repetition period of the coded combinations of the same line, the multiplexor transmits in series, the 32 coded combinations originating from the 32 lines, at the rate of a bit about every 500 ns. A supermultiplexor can then combine 8 primary multiplex groups, for instance, to constitute a secondary multiplex group. Within a multiplex cycle of 125$\mu$s, the secondary multiplex group routes the 256 coded combinations originating from the 8 primary groups. The coded combinations originating from the same line are thus transmitted within time intervals of about 500 ns repeated every 125$\mu$ s and constituting a time channel. These combinations are transmitted either in series onto a conductor, at the rate of a bit about every 60 ns, or in parallel onto 8 conductors, one for each bit.

In the other transmission direction, from a secondary multiplex group routing the signals provided for 256 lines, a superdemultiplexor first separates the 8 primary multiplex groups. For each of them, a demultiplexor then provides, towards 32 lines, coded combinations which are decoded, to restore the voice frequency signals after a filtering operation.

As several incoming and outgoing secondary multiplex groups are thus constituted, calls are established with a switching network selecting the coded combinations appearing on a time channel of an incoming secondary group (corresponding to a calling line, for instance) and routing them towards a time channel of an outgoing secondary group (called line, for instance). A similar connection path is simultaneously established for the other transmission direction (called line towards calling line).

The switching network then effects space switching operation (connections from one group to another group); and time switching operations (connections from one channel to another channel); it includes, for that purpose, space switches and memories. This network can be, for instance, of the so-called space-time-space type. A connection path between an incoming channel of a first line (A) and an outgoing channel of a second line (B) goes through two switches arranged on both sides of a memory cell; one of them enables it to have access to the incoming secondary multiplex groups, the other one to the outgoing secondary multiplex groups. In that way, within each multiplex group, at the channel time peculiar to the incoming channel (line A) and through the first switch directed towards the appropriate incoming group, a coded combination originating from this incoming channel is registered in the memory cell. At the channel time peculiar to the outgoing channel (line B) and through the second switch directed towards the appropriate outgoing group, the coded combination originating from the incoming channel and kept in the memory cell is retransmitted onto this outgoing channel. The connection in the opposite direction, between the incoming channel of the second line (B) and the outgoing channel of the first line (A) is established in the same way.

Practically, the numerous necessary memory cells are memory cells belonging to several speech memories and two space switches are associated with each of these memories. At each channel time, a memory cell is connected by the switches to the appropriate incoming and outgoing groups.

In such a center, the supermultiplexors, switches, memories superdemultiplexors are units which procees, through a time-division multiplexing, a great number of calls. Every failure in these units influences seriously the grade of service of the whole center and the means for palliating the effects of it are consequently of great importance.

One of the faults which can particularly occur in these units, due to a failure in the addressing circuits, for instance, results in the parallel connection of two incoming channels, towards the same outgoing channel. Due to the short-circuit of a component, a switch can thus associate the input of a memory, not only with a specified incoming secondary multiplex group, but also with another incoming multiplex group. The coded combinations originating from these two groups will be then mixed up. Such a fault can affect all the calls processed by the considered switch. It is consequently important to minimize the effects of it.

The parallel connection of two channels will result generally in the combination, according to the logic function OR, of the coded combinations originating from two channels. If the nominal incoming channel is silent, the correspoding outgoing channel will receive practically the combinations provided by the disturbing incoming channel. This consitutes a sort of intelligible crosstalk which cannot be accepted.

SUMMARY OF THE INVENTION

The present invention concerns an intelligible cross-talk protective system for use in time division switching centers which minimizes efficiently the effects of an accidental parallel connection of two incoming channels.

According to the invention, logic means are provided in the vicinity of the inputs of the center, to invert the bits defining the amplitude in the coded combinations the polarity bit of which has a particular value, so that, when a particular channel is silient, the coded combinations inserted into the center are not all null but on the contrary take such values that they mask at least partly possible disturbing signals, which otherwise would tend to destroy the intelligibility of signals transmitted over that particular channel.

In the vicinity of the center outputs, similar logic means introduce a new inversion which restores the initial combinations.

BRIEF DESCRIPTION OF THE DRAWINGS

Different other objects and features of the invention will become more apparent from the following description of a preferred embodiment thereof, taken in conjunction with the accompanying drawings, wherein.

DESCRIPTION OF A PREFERRED EMBODIMENT

Figure 1:
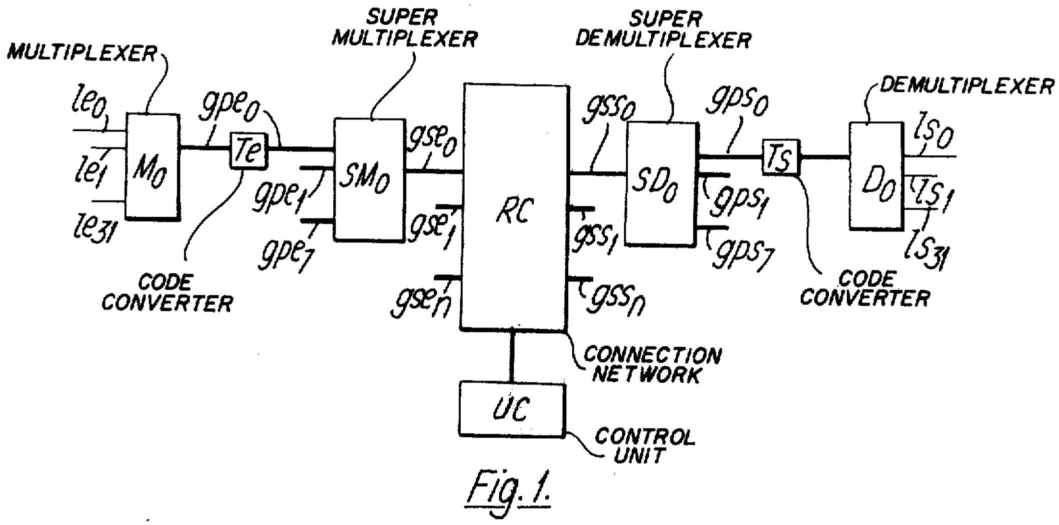
FIG. 1, shows the general block diagram of a time division switching center.

FIG. 1 shows the general diagram of the connections of a time division switching center provided with intelligible crosstalk protective means, as an application of the system forming the subject of the present invention.

In this center, incoming lines, $le_0$, $le_1$. . . $le_{31}$, are connected to a multiplexor $M_0$ which associates them to constitute an incoming primary multiplex group $gpe_0$. These incoming lines provide the multiplexor with the 8-bit coded combinations including a polarity bit and 7 amplitude bits which will be represented by the expression S *abcdefg*. Each incoming line provides a combination every 125 $\mu$s. Within a cycle of 125 $\mu$s, the multiplexor $M_0$ provides, on the primary group $gpe_0$, in series, the 32 8-bit combinations originating from the lines $le_0$ to $le_{31}$ at the rate of a bit about every 500 ns.

Other multiplexors not represented constitute in the same way incoming primary groups $gpe_1$ to $gpe_7$.

The function and the constitution of the code conversion devices such as Te inserted into the incoming primary groups will be described subsequently.

The incoming primary groups $gpe_0$ to $gpe_7$ are connected to a supermultiplexor $SM_0$ which associates them to constitute an incoming secondary multiplex group $gse_0$. This secondary group is of the "parallel" type; it comprises as many conductors as a coded combination comprises bis, i.e. 8. Within a cycle of 125 $\mu$s, the supermultiplexor $SM_0$ provides consequently, on the secondary group $gse_0$, in parallel, the 8 times 32 coded combinations originating from the primary groups $gpe_0$ to $gpe_7$, at the rate of a combination about every 500 ns.

Other supermultiplexors not represented constitute in the same way incoming secondary groups $gse_1$ to $gse_n$.

All the incoming secondary groups are connected to a connection network RC controlled by a control unit UC. Outgoing secondary groups $gss_0$, $gss_1$ . . . $gss_n$ similar to the incoming groups, are, on the other hand, connected to this connection network. The connection network RC and its control unit which can take on different forms and go out of the scope of the invention will not be described.

The outgoing secondary multiplex group $gss_0$ leads to the superdemultiplexor $SD_0$ which separates it into 8 outgoing primary multiplex groups $gps_0$, $gps_1$. . . $gps_7$. The signals conveyed by these outgoing primary groups are the same as those of the incoming primary groups.

Other superdemultiplexors not represented decompose in the same way the outgoing secondary multiplex groups $gss_1$ to $gss_n$.

The outgoing primary multiplex group $gps_0$ leads to the demultiplexor $D_0$ which distributes the 32 coded combinations which it receives within each multiplex cycle on 32 outgoing lines $ls_0$, $ls_1$. . . $ls_{31}$.

The function and the constitution of the code conversion devices such as Ts inserted into the outgoing primary groups will be described subsequently.

An incoming line $le_0$ associated with an outgoing line $ls_0$, for instance, corresponds on the diagram of FIG. 1 to every subscriber's line. The subscriber's line and the equipment, hybrid circuit, coder and decoder, which are peculiar to it and connect it to the incoming and outgoing lines have not been represented. To an incoming line ($le_0$) then correspond a time channel in a primary group ($gpe_0$) then a time channel in a secondary group ($gse_0$). In the same way, a time channel of a secondary group ($gss_0$) and a time channel of a primary group ($gps_0$) corresponds to an outgoing line ($ls_0$).

In other respects, every telephone call requires the connection of the incoming line of the calling line with the outgoing line of the called line, and the connection of the incoming line of the called line with the outgoing line of the calling line. The switching network RC, to establish such a call, routes consequently the coded combinations which it receives on a time channel of an incoming secondary group (corresponding to the incoming line of the calling line) up to a time channel of an outgoing secondary group (corresponding to the outgoing line of the called line). A similar connection is simultaneously established between another time channel of an incoming secondary group (incoming line of the called line) and another time channel of an outgoing secondary group (outgoing line of the calling line).

All the required calls are thus established in the switching network RC as a response to orders provided by the central unit UC.

The invention concerns particularly the failures the effect of which is such that coded combinations originating from two incoming lines ($le_0$ and $le_1$, for instance) are transmitted simultaneously to an outgoing line ($ls_{31}$, for instance), while this outgoing line $ls_{31}$ should receive only the coded combinations originating from the incoming line $le_0$; the failure can have occurred in any one of the units arranged on the path of these coded combinations, according to the diagram of FIG. 1, in the switching network RC, for instance.

In the absence of every protective device, the combinations originating from two incoming lines will be superposed in a general way, according the logic function OR. If one of the combinations is 1 1100011 and the other 0 1101101, the outgoing line will receive the combination 1 1101111. There is no addition of the coded signals originating from the two lines and, although the call between the lines $le_0$ and $ls_{31}$ is disturbed, the result of the superposition is such that the voice signals originating from the line $le_1$ will not be perceived in an intelligible way by the subscriber of the line $ls_{31}$. However, if the subscriber of the line $le_0$ remains silient, the combinations provided on the incoming line $le_0$ will be of the type 0 0000000 or 1 0000000. Particularly, in the case of the combination 0 0000000, the superposition of any combination of the shape S *abcdefg* originating from the incoming line $le_1$ will precisely provide this combination S *abcdefg* on the outgoing line $ls_{31}$. The subscriber of the line $ls_{31}$ will consequently hear distinctly the words pronounced by the subscriber of the line $le_1$ and which are not provided for him. Such an intelligible crosstalk cannot be accepted.

The invention consequently provides to insert code conversion devices Te and Ts, into the transmission path of the coded signals, in order to modify the coded combinations in such a way that the failure previously considered cannot give rise to an intelligible crosstalk.

The device Te brings a modification to the coded combinations and the device Ts brings to them a complementary modification which cancels the first one, so that the combinations introduced at its inputs are found again unchanged. These code conversion devices have been inserted into the primary multiplex groups so that the protection includes the supermultiplexors, the switching network and the superdemultiplexors, without, however, their number being too high. Nevertheless, it is well obvious that they could be arranged somewhere else either at the line levels, or at the secondary group level.

Figure 2:
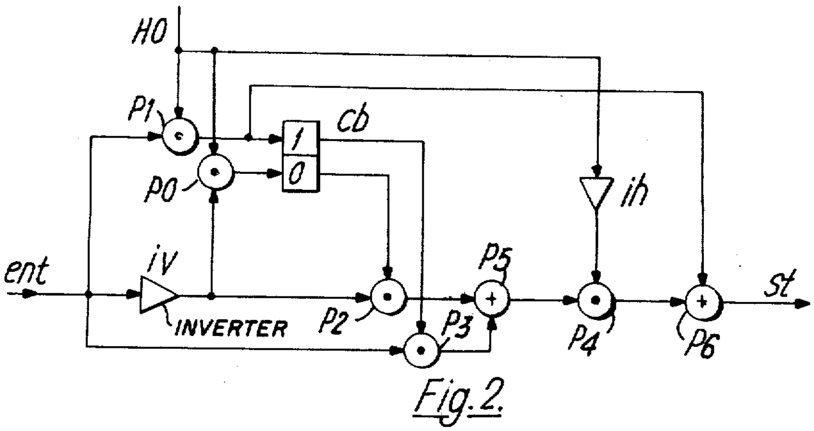
FIG. 2, shows an embodiment of the provided logic circuit, according to the invention, to obviate the effects of a failure able to produce an intelligible crosstalk.

Practically, the code conversion devices Te and Ts can be identical as it can be judged by the description of an embodiment of these devices made with reference to FIG. 2.

The code conversion device of FIG. 2 includes a bistable circuit *cb*, and inverter *iv*, AND gates *pO* to *p4* and OR gates *p5* and *p6*. It comprises an input *ent* and an output *st*. It receives on it input *ent* the coded combinations transmitted in series by a multiplexor such as $M_0$. It also receives, provided by clock means not represented on FIG. 1, a clock signal Ho which coincides with the sign bit, i.e. the first bit of each coded combination. It finally provides on its output *st* modified coded combinations.

The operation of the device will be described by assuming first that it receives, at *ent*, the first bit of a coded combination. It will be first considered that this bit has the value 1. At the same time, the device receives the clock signal Ho. Consequently, the gate AND *p1* operates and provides a signal of value 1 which is directly retransmitted onto the output *st*, through the OR gate *p6*.

The output signal of the gate *p1* is also transmitted to the bistable circuit *cb* and sets this bistable circuit to 1. The bistable circuit then provides on its upper output a signal which makes conducting the gate *p3*. The input signal can pass through the gates *p3* and *p5*, but it is still blocked by the gate *p4*.

This first sign bit transmitted without any modification through the code conversion device up to the output *st* is followed by 7 amplitude bits. As the clock signal Ho is completed, the inverter *ih* then provides a signal opening the gate *p4*. Consequently, the 7 amplitude bits follow a path in the code conversion device between the input *ent* and the output *st*, through the gate *p3*, the OR gate *p5*, the gate *p4* and the OR gate *p6*. These bits are thus retransmitted onto the output *st* without any modification.

Consequently, the code conversion device does not modify the combinations the sign bit of which is 1.

It will be now supposed that a coded combination the sign bit of which is 0 occurs. The clock signal Ho is provided simultaneously with this sign bit.

As the latter has a value 0, the gate *p1* does not operate, while the inverter *iv* provides a signal of value 1. The gate *pO* operates and provides a signal resetting the bistable circuit *cb*. The bistable circuit *cb* then opens the gate *p2*. In other respects, the gate *p4* is blocked by the inverter *ih* and no signal is provided on the output *st*, which corresponds to the transmission of a sign bit of value 0. The sign bit is consequently transmitted again without any modification.

The 7 amplitude bits then follow. As the signal Ho is completed, the gate *p4* is made conducting. The 7 bits find in the code conversion device a path through the inverter *iv*, the gate *p2*, the gate *p5*, the gate *p4*, the gate *p6*. This path includes the inverter *iv*, so that the bits transmitted onto the output *st* are inverted in relation to those which are received on the input *ent*.

Finally, the code conversion device illustrated by FIG. 2 transmits without any modification the coded combinations the sign bit of which has for value 1, while the coded combinations the sign bit of which has for value 0 have their amplitude bits inverted.

It operates in series, as it is at the level of the primary groups. It is will obvious that the designing of a parallel device operating the same code conversion at the level of the secondary groups would offer no difficulty.

The interposition of two similar devices (Te and Ts) on the transmission path of the coded combinations brings to some combination two successive inversions which cancel each other, so that, in the center of FIG. 1, the combinations provided by the incoming lines are found again on the outgoing lines. The devices Te and Ts of FIG. 1 can be identical with the device of FIG. 2.

The effect of the protecting device comprising the code conversion devices of FIG. 2, will be now considered, in case of failure and, particularly, when, the channel normally through-connected being silient, the disturbing channel would risk to be distinctly perceived. As previously, the case of a failure will be resumed in the switching network RC (FIG. 1) bringing a mixing of the combinations originating from the incoming lines $le_0$ and $le_1$, towards the outgoing line $ls_{31}$.

The critical case, as previously indicated, is met when the incoming line normally through-connected is silent, i.e. provides combinations which can be, at random, either of the type 0 0000000, or of the type 1 0000000. The code conversion device Te will convert the first combination into 0 1111111, while the combination 1 0000000 will remain unchanged. The mixing of the combination 0 1111111 with any combination S *abcdefg*, will provide a combination S 1111111. Then, according to the value of S, the code conversion device Ts will provide, towards the outgoing line $ls_{31}$, either the combination 1 1111111, or the combination 0 0000000. The disturbing crosstalk will produce no crosstalk.

If the mixing of the combination 1 0000000 with any combination S *abcdefg*, is then considered, the resulting combination will be 1 *abcdefg;* this combination will be transmitted without any modification by the device Ts towards the outgoing line $ls_{31}$. This modification of the sign suffices as it will be seen, to make unintelligible the disturbing signals. Indeed, the disturbing combination, if it initially comprised a sign S equal to 0, has already been inverted in the code conversion device through which it has already passed at the input of the network (the device Te in the case of crosstalk previously considered) this inversion will not be cancelled in the device Ts, as the sign becomes 1 in the combination resulting from the mixing. Consequently, the signals reading the outgoing line $ls_{31}$ will be inverted whenever then original sign will be 0, while then sign will be simultaneously inverted and the resulting voice signal will be unintelligible.

Of course, if the incoming line $le_0$ provides non-null combinations, because the subscriber speaks, these combinations will be combined without being added to the disturbing combinations and those will not give rise to an intelligible crosstalk.

The protective device of the invention, characterized by the insertion of code conversion devices such as the one of FIG. 2, then enables, at little cost, eliminating any risk of intelligible crosstalk by a mixing of two channels in a time division switching center.

It is clearly understood that the preceding descriptions are made only by way of example and not as limitation to the scope of the invention. The numerical examples, more particularly, have been given only to make the descriptions easier and can change with each case of application.

We claim:

1. A protective system to prevent the occurrence of intelligible crosstalk between time division channels comprising, code conversion means coupled near the inputs of a time division switching center, said code conversion means receiving incoming time division signals including a polarity bit and coded combinations of amplitude bits, said code conversion means transmitting the polarity bit unchanged, said code conversion means responding to a polarity bit of a first value to transmit the amplitude bits unchanged and to a polarity bit of the opposite value to invert the amplitude bits and then transmit them, and, complementary code conversion means coupled at the outputs of the center, said complementary code conversion means transmitting the polarity bit unchanged and inverting the amplitude bits of the coded combinations when the polarity bit has said particular value, whereby when one channel is silent, the coded combinations inserted into the center are never null or almost null, but on the contrary take values adapted to mask at least partly possible disturbing signals, and destroy intelligibility of said disturbing signals.

2. The invention of claim 1, in which the code conversion means comprises a bistable circuit, said bistable circuit responds according to the value of the polarity bit of each coded combination to be set in one of its two positions, and two transmission paths arranged in parallel and conditioned respectively by the two complementary outputs of the bistable circuit, one of said two paths routing the bits defining the amplitude of the coded combinations without modifying them, while the other includes an inverter to invert said bits.

3. The invention of claim 1, in which said code conversion means are inserted into incoming and outgoing primary multiplex groups of a time division switching center.

* * * * *